Figure 1:
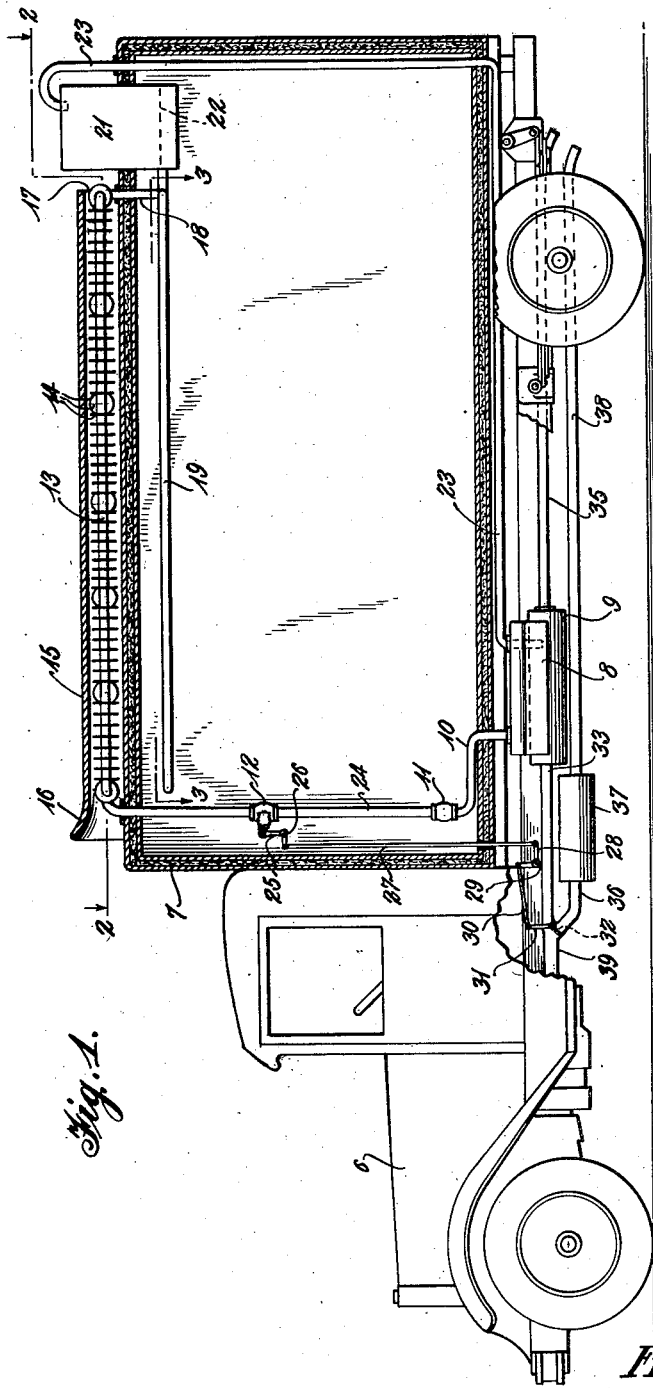

March 5, 1940.　　F. M. PRINCE　　2,192,367
REFRIGERATING APPARATUS
Filed Aug. 20, 1938　　2 Sheets-Sheet 1

Inventor
Frank M. Prince
By James P. Burns
Attorney

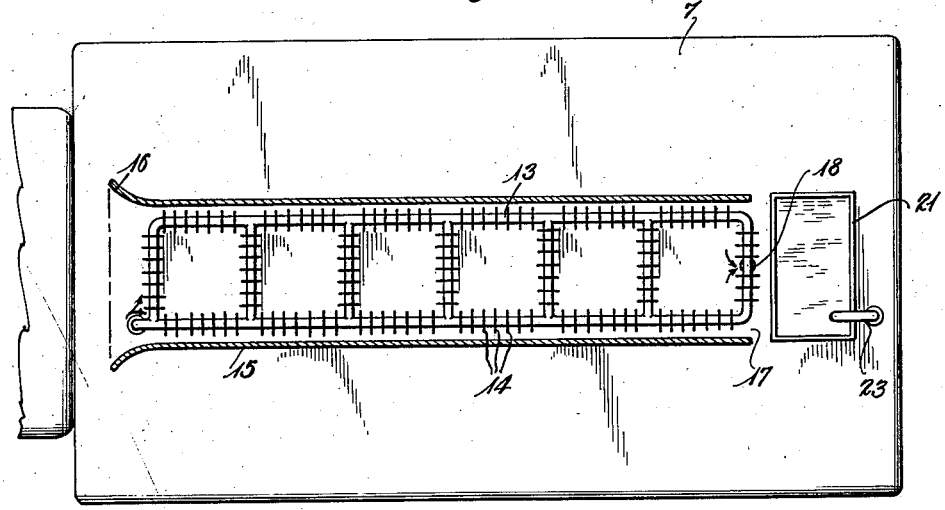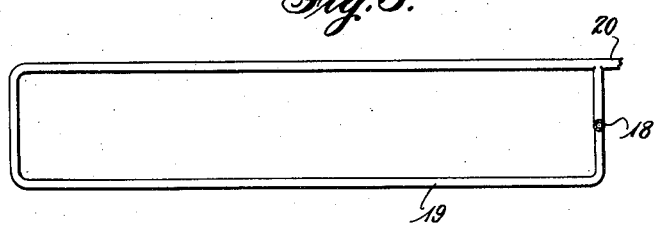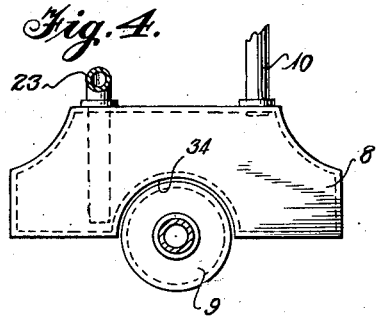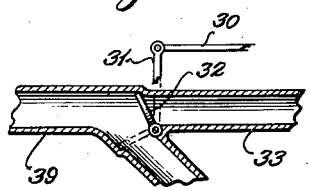

Patented Mar. 5, 1940

2,192,367

UNITED STATES PATENT OFFICE 2,192,367

REFRIGERATING APPARATUS

Frank M. Prince, Birmingham, Ala.

Application August 20, 1938, Serial No. 225,926

4 Claims. (Cl. 62—118)

This invention relates generally to refrigerating apparatus and more specifically to refrigerating apparatus of the intermittent absorption type which is particularly designed for use with moving vehicles propelled by internal combustion engines.

I am aware that various types of refrigerating apparatus have heretofore been designed for particular use on moving vehicles but they have invariably been of complex design which is necessarily accompanied by high initial and maintenance costs. A particular problem exists in designing refrigerating apparatus for moving vehicles. In traveling over the highways it is of course necessary for these vehicles to ascend and descend steep grades, with the result that, often for long periods of time, the body of the vehicle will be inclined from a horizontal plane. While this inclination from a horizontal plane presents no serious difficulties with refrigerating apparatus of the compression and expansion type, apparatus of the absorption type is much to be preferred both because of its low initial cost and for the reason that what would otherwise be waste heat from the exhaust of the internal combustion engine may be used to heat the generator. A serious problem has, however, heretofore existed in the use of the absorption type of apparatus on motor vehicles for the reason that it is necessary to have a liquid in the cooling coils of the apparatus and it has been impossible to retain this liquid in cooling coils which are inclined from the horizontal during the ascent or descent of steep grades.

It is therefore the primary object of my invention to produce an absorption type refrigerating apparatus for use on automotive vehicles which is capable of continued and uninterrupted operation despite the inclinations which it is necessary for the vehicle to assume.

Another object of my invention is to produce a refrigerating apparatus for vehicles which is extremely simple in design, which has a very low initial cost, and which utilizes the waste heat from an internal combustion engine for its operation.

Other objects and advantages of the invention will appear from the following description and the accompanying drawings.

In the accompanying drawings wherein like reference numerals indicate like parts in each of the views, Figure 1 is a side elevation view partly in section of a motor vehicle showing my apparatus associated therewith, Figure 2 is a cross sectional view on the line 2—2 of Fig. 1, Figure 3 is a cross sectional view taken on the line 3—3 of Fig. 1 and shows the cooling coils of my apparatus, Figure 4 is an enlarged end elevational view of the combination generator absorber of my apparatus associated with the exhaust heating unit, and Figure 5 is an enlarged sectional view showing my valve structure for directing the hot exhaust gases from the engine to the generator heating unit or for by-passing them around this heating unit.

Referring now more particularly to the drawings, the reference numeral 6 designates generally an automotive vehicle having an insulated compartment designated by the reference character 7. The reference numeral 8 designates a combination generator-absorber which is conventionally designed to operate intermittently as a generator in the intervals during which it is being heated and as an absorber during the period in which heat is not being applied. At the beginning of a cycle of operation, the generator-absorber 8 is cold and contains a suitable absorbing liquid such as water having absorbed therein a suitable refrigerant such as ammonia gas. This liquid and its absorbed gas are then heated by means of the heating unit 9, the operation of which will be explained later in this specification, and during this heating stage the member 8 acts as a generator. During heating the ammonia gas will be driven off from the liquid and will rise through the conduit 10 past the liquid trap 11 and the control device 12 to the condenser 13 which is located above the insulated roof of the compartment 7. I have represented the condenser coils as being of grid shape and as being provided with cooling fins 14. The condenser is preferably covered with an arch 15 which is flared at its forward end as shown at 16. Being open at its forward flared end, this arch will cause a strong current of air to flow over the condenser 13 during the motion of the vehicle. This air current will escape through the open rearward end 17 of the covering arch, and in passing over the condenser 13 will cool the gaseous ammonia therein and condense it into liquid ammonia. This condensed ammonia will flow by gravity from the condenser through the downwardly extending pipe 18 into the refrigerating coil 19 which is within the insulated truck body. In flowing through the cooling coil 19, this liquid ammonia will evaporate into ammonia gas, thus absorbing heat and giving the desired cooling effect within the interior of the vehicle body.

The end 20 of the cooling coil 19 extends into the side of a receptacle which I term a slush tank and which is designated by the reference character 21. This slush tank 21 constitutes an important feature of my invention and its purpose is to enable refrigeration to continue during ascent or descent of steep grades by the vehicle. The cooling coil 19 is positioned in a horizontal plane parallel to the plane of the road bed upon which the vehicle travels. Were it not for the slush tank 21, a large portion of the liquid ammonia which is contained within the cooling coil 19 would flow to the rear of the cooling coil when the truck was ascending a steep grade and would therefore return to the generator-absorber 8 in a liquid condition, and therefore the cooling effect resulting from the evaporation of the liquid ammonia within the cooling coil would be lost. However, during the heating of the generator 8 and the condensation of the gaseous ammonia into a liquid state in the condenser 13, the cooling coil 19 will become partially filled with the liquid ammonia and the slush tank 21 will also become partially filled with liquid ammonia to, for example, the level indicated by the dotted line 22. It will be obvious that this liquid ammonia within the slush tank 21 will furnish sufficient hydrostatic head to maintain the cooling coils 19 partially filled with liquid ammonia during the descent of all ordinary grades over which the vehicle may be called upon to travel. It will also be obvious that during the ascent of grades by the vehicle, the liquid ammonia in the cooling coil 19 will flow by gravity to the rearward end of the cooling coil and into the slush tank 21. Evaporation of this ammonia will continue within the filled portion of the cooling coil and also within the slush tank 21.

Since, during the ascent of grades, the slush tank forms an important portion of the evaporating zone, it is necessary to have the lower portion of this tank within the insulated compartment 7 of the vehicle body. The upper portion of the tank which is not enclosed within the vehicle body is preferably lagged with some suitable heat insulating material.

After substantially all of the ammonia which had been absorbed in the water within the generator-absorber 8 has been driven off, the heating of the generator-absorber 8 is discontinued and the generator is permitted to cool to thereby assume its function as an absorber. The remaining liquid will be principally water which upon cooling will be capable of reabsorbing the evaporated ammonia. Evaporation of the liquid ammonia will occur within the cooling coil 19 and the resulting ammonia gas will return to the absorber 8 through the slush tank 21 and the return pipe 23 which discharges below the water level within the absorber 8. This returning ammonia gas, being discharged below the water level within the absorber, will bubble up through the water and be reabsorbed. After all the ammonia within the cooling coils 19 and the slush tank 21 has evaporated and the resulting gas has been reabsorbed within the water of the absorber 8, the entire cycle is repeated.

The water trap 11 is of any conventional type and its purpose is to prevent any liquid from ascending in the pipe 24 while at the same time permitting the ammonia vapor to rise within this pipe.

The means for controlling the application and cut-off of heat to the generator are more or less conventional and need be only briefly described here. The control device 12 may be of any conventional bellows type which is responsive to pressure changes. When the generator-absorber 8 has cooled sufficiently and has reabsorbed sufficient of the ammonia gas to reduce the pressure within the entire apparatus to the pressure for which the control device is calibrated, the bellows will respond to this reduced pressure and will actuate the crank arm 25 which is pivoted at 26, and by means of the link 27 through the crank 28 which is pivoted at 29 and to the link 30 and the arm 31, will cause the butterfly valve 32 in the exhaust pipe 39, which is best shown in Fig. 5, to move to the position shown by the dotted lines in Fig. 5, thereby directing the hot exhaust gases from the internal combustion engine through the pipe 33 into the heating unit 9 which is intimately associated with the generator-absorber 8. The under side of the generator 8 is preferably formed with a depression which fits over the cylindrical surface of the heating unit 9. The interior of the heating unit 9 is provided with baffle plates similar to those used in an ordinary exhaust muffler. The exhaust gases, after leaving the heating unit 9, are carried to the rear of the vehicle by means of the exhaust pipe 35.

After the exhaust gases have been flowing through the heating unit 9 for a sufficient period of time, the generator will have vaporized sufficient ammonia to build up the pressure within the entire system. The control device 12 is designed to actuate in the opposite direction upon reaching this predetermined higher pressure, and this opposite movement of the control device will cause the butterfly valve 32 to assume the position shown by the full lines in Fig. 5. In this position the valve 32 will close the entrance to the pipe 33 and the hot gases will flow through the exhaust pipe 36, the muffler 37 and the tail piece 38.

Alternatively, the control device 12 may be replaced with other suitable means for controlling the butterfly valve 32. For example, under conditions where it is necessary to carefully control the temperature within the vehicle body it may be advisable to control the valve 32 by means of a thermostat. Provision may also be made for manual operation of the valve 32.

It will thus be seen that I have provided a refrigerating apparatus for a motor driven vehicle which is extremely simple in design, which has a small number of parts, and which will therefore have a very low initial cost. No additional power is required from the prime mover to operate the apparatus for it utilizes only waste heat. It will also be apparent that I have overcome the heretofore existing difficulty which has prevented the adoption of absorption type refrigerating apparatus for the use on moving vehicles.

I do not wish my invention to be limited except as specifically pointed out in the appended claims. While in the drawings I have shown my apparatus as attached to a motor truck, it is obvious that it may be used with equal facility with passenger buses or automobiles. Although in the illustrative description of my device, I have mentioned the use of ammonia as the refrigerating medium, it is obvious that any other suitable refrigerant may be used.

Having thus described my invention, I claim:

1. In combination with a vehicle adapted for traveling over ascending and descending grades and having an insulated compartment, a refrigerating apparatus of the intermittent absorption type comprising a generator-absorber, means for intermittently heating said generator-absorber, a condenser spaced above and communicating with said generator-absorber, a cooling coil communicating with and spaced at a lower level than said condenser and within said insulated compartment, said cooling coil being positioned to lie in a plane parallel to the road bed over which the vehicle travels, liquid refrigerant containing means in open communication with said cooling coil, said means being so positioned as to maintain said cooling coil partially filled with liquid refrigerant regardless of the inclination which the vehicle may assume, and a conduit connecting said means with the generator-absorber.

2. In combination with a vehicle adapted for traveling over ascending and descending grades and having an insulated compartment, a refrigerating apparatus of the intermittent absorption type comprising a generator-absorber, means for intermittently heating said generator-absorber, a condenser communicating with said generator-absorber, a cooling coil communicating with and spaced at a lower level than said condenser and within said insulated compartment, said cooling coil being positioned to lie in a plane parallel to the road bed over which the vehicle travels, a liquid refrigerant containing receptacle in open communication with said cooling coil, said receptacle being so positioned as to maintain said cooling coil partially filled with liquid refrigerant regardless of the inclination which the vehicle may assume, and a conduit connecting the top of said receptacle with the bottom of said generator absorber.

3. In combination with a vehicle adapted for traveling over ascending and descending grades and having an insulated compartment, a refrigerating apparatus of the intermittent absorption type comprising a generator-absorber, means for intermittently heating said generator-absorber, a condenser spaced at a higher level and communicating with said generator-absorber, a cooling coil communicating with and spaced at a lower level than said condenser and within said insulated compartment, said cooling coil being positioned to lie in a plane parallel to the road bed over which the vehicle travels, a liquid refrigerant containing receptacle in open communication with said cooling coil, said receptacle being so positioned as to maintain said cooling coil partially filled with liquid refrigerant regardless of the inclination which the vehicle may assume, and a conduit connecting said receptacle with said generator-absorber.

4. In combination with a vehicle adapted for traveling over ascending and descending grades and having an insulated compartment, a refrigerating apparatus of the intermittent absorption type comprising a generator-absorber, means for intermittently heating said generator-absorber, a condenser positioned above said insulated compartment and communicating with said generator-absorber, an elongated cooling coil communicating with and spaced at a lower level than said condenser and within said insulated compartment, said cooling coil being so positioned as to lie in a plane parallel to the road bed over which the vehicle travels, a liquid refrigerant containing receptacle in open communication with said cooling coil, said receptacle being so positioned as to maintain said cooling coil partially filled with liquid refrigerant regardless of the inclination which the vehicle may assume, and means for placing the top of said receptacle in communication with the bottom of said generator-absorber.

FRANK M. PRINCE.